Figure 1:
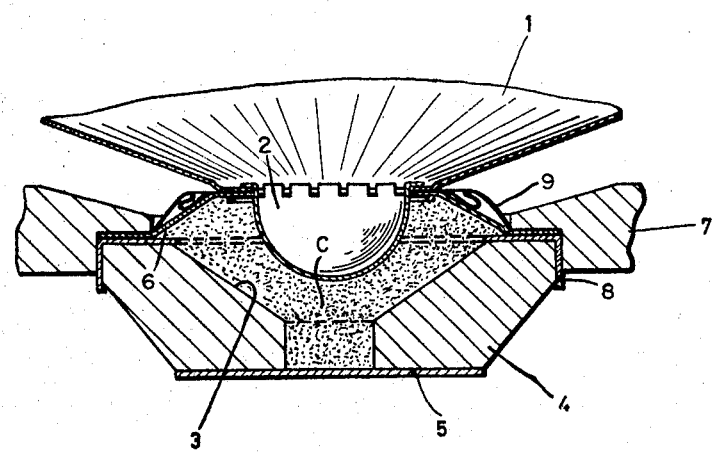

Oct. 4, 1966　　　A. ADAM　　　3,277,247

MOISTURE-PROOF CARBON MICROPHONE

Filed Feb. 27, 1962

3,277,247
MOISTURE-PROOF CARBON MICROPHONE

Adolf Adam, Munich, Germany, assignor to Siemens & Halske Aktiengesellschaft, Berlin and Munich, Germany, a corporation of Germany
Filed Feb. 27, 1962, Ser. No. 175,960
Claims priority, application Germany, Mar. 2, 1961, S 72,788
6 Claims. (Cl. 179—122)

The invention disclosed herein is concerned with a carbon microphone having a carbon chamber which is protected against moisture.

It has been known for many years that the efficiency of carbon microphones drops strongly when they are for some time used in moist surroundings or in the free atmosphere. This reduction of the microphone efficiency is due to the absorption of moisture by the carbon powder, causing it to cake, so that the oscillations of the movable membrane cannot produce the resistance changes required for high efficiency. However, the desire for high operating reliability is particularly present in the case of microphones which are predominantly subjected to great climatic stresses, as for example, in the case of carbon microphones included in telephones designed for military use in the field. The problem of constructing moisture-proof carbon microphones received for these reasons frequent attention and various solutions have been proposed therefor.

One of the many previously suggested solutions, which may be considered as underlying the present invention, proposes to seal the carbon chamber by means of a felt strip arranged between the membrane and the fixed electrode, and to encase the carbon chamber as well as the membrane in a cohesive protective envelope made of water-proof material. An undulating member of soft material is employed in such structure to provide for the equalization of pressure.

The carbon microphone according to the present invention, in which a part of the border or delimiting wall of the carbon chamber is premeable to air and in which the carbon chamber is likewise sealed by moisture-proof foil which can flex or give in proper direction responsive to exterior pressure variations, distinguishes from the above noted prior structure, in that the moisture-proof foil embraces or overlies only the air permeable part of the border wall of the carbon chamber, such foil being arranged so close to this part of the border wall that the intermediate space, lying at average atmospheric pressure between the border wall and the foil, is responsive to an increase of the outer air pressure, by flexing displacement of the moisture-proof foil with respect to the border wall, just sufficient to make a pressure equalization possible between the air pressure interiorly and exteriorly of the carbon chamber.

It may be mentioned at this point that, while the previously noted known microphone solves the problem of preventing on the one hand entry of air moisture into the carbon chamber while making on the other hand a pressure equalization possible between the carbon chamber and the ambient atmosphere, such previous structure occasions difficulties whenever a great pressure difference has to be equalized within a short time interval. It may happen, for example, in the transport in an airplane which is within a short time interval subjected to great changes in air pressure, that the protective envelope bursts.

As compared with this situation, a carbon microphone, made according to the present invention, can be subjected to great fluctuations in air pressure without suffering any damage. This is due to the fact that the amount of air, for which a pressure equalization is required, has been reduced to the smallest possible value, thereby reducing to a minimum the volume changes for a pressure equalization.

A microphone for use in moisture filled rooms has also become known, which provides for the sealing of the entire microphone casing and in addition thereto for the sealing of the carbon chamber by an elastic disk, the rim of which lies in engagement with the rim of the carbon chamber. The elastic disk also forms in this structure the border or delimiting wall of the carbon chamber. This results in considerable drawbacks. In case this disk is made so elastic that practically no forces are absorbed thereby incident to deformation caused by air pressure changes—such requirement being posed in view of uniform sensitivity—whereby the air pressure equalization is effected solely by changes in the volume of the carbon chamber, the operation will result in changes in the electrical properties of the microphone. This is due to the fact that space of more or less extent is available to the carbon depending upon the outer air pressure, and this means that the resistance value between the two electrodes depends upon the outer air pressure.

In a preferred embodiment of the carbon microphone according to the invention, the air permeable part of the border or delimiting wall of the carbon chamber is formed by a silk disk which is arranged between the moveable electrode and the fixed part of the carbon chamber boundary, such silk disk being embraced by an overlying foil which is impermeable to moisture and which extends at average atmospheric air pressure in folded manner. If the foil is made of thermoplastic synthetic material, its mounting may be facilitated by bonding it marginally to the silk disk prior to placing it into position in the microphone structure.

Further details of the invention will appear from the description of an embodiment thereof which is rendered below with reference to the accompanying drawing.

Figure 2:
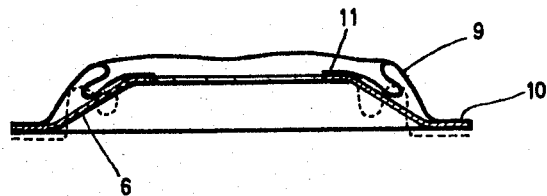

FIG. 1 shows in cross-sectional representation the parts of a carbon microphone with a carbon chamber which is protected against moisture, which are of interest in connection with the invention; and FIG. 2 shows separately the silk disk and the moisture impermeable sealing foil.

Referring now to FIG. 1, numeral 1 indicates the membrane which is marginally held in place and to which is fastened the semispherical movable electrode 2, the latter being electrically connected with the fixed electrode 4 over the carbon C contained in the chamber 3. The carbon chamber 3 is delimited by the movable electrode 2, the fixed electrode 4, the cover disk 5 and the air permeable silk disk 6. The silk disk 6 is constructed in known manner and fastened on the one hand to the fixed and on the other hand to the movable part of the microphone and shall extend relatively loosely between these two parts. An annular insulating member 8 is provided for insulating the fixed electrode with respect to the intermediate wall 7.

Known microphones of this type are protected by a moisture impermeable foil which is arranged ahead of the membrane and adapted to equalize only slight air pressure fluctuations. In accordance with the present invention, the silk disk 6 is embraced by a moisture impermeable foil 9, overlying the silk disk, such foil lying at average atmospheric air pressure in folded cuff-like manner about the silk disk.

It is important, in view of the frequency response of the microphone, that the moisture impermeable foil as well as the silk disk are not rigidly clamped in position between the movable and the fixed parts, but that they extend in any operating condition relatively loosely therebetween, so that they cannot practically affect the motion of the membrane.

The silk disk 6 and the moisture impermeable sealing foil 9 are shown separately in FIG. 2. The sealing foil 9 is made of a thermoplastic synthetic material, the outer rim 10 and the inner rim 11 thereof being bonded to the silk disk 6. The shape of the sealing foil, prior to the bonding to the silk disk, is indicated in dash lines.

The sealing foil 9 must not lie in engagement with the silk disk over the entire plane thereof, but must embrace or overlie the silk disk in folded fashion. When positioned in this manner, the sealing foil will in response to an increased outer air pressure press against the silk disk and thus reduce the air space of the carbon chamber, thereby likewise effecting an increase of the air pressure therein, while moving or flexing aside outwardly responsive to reduced outer air pressure and thereby effecting an air pressure equalization by increasing the air space of the carbon chamber.

Changes may be made within the scope and spirit of the appended claims which define what is believed to be new and desired to have protected by Letters Patent.

I claim:

1. A carbon microphone having means forming a carbon chamber, said means comprising a wall delimiting a part of said carbon chamber, part of said wall being air permeable, a flexible moisture impermeable foil for sealing said carbon chamber to the exterior, said foil extending across and overlying the air permeable part of said wall, forming a chamber the effective volume of which is defined substantially by said foil and permeable wall part, with said foil being operative, responsive to outside air pressure fluctuations, to flex with respect to said air permeable part, said chamber having a volume at average atmospheric air pressure which, responsive to an increase of the external air pressure, is just sufficient to effect, by flexing of the moisture impermeable foil relative to the air permeable part, a pressure equalization between the air pressure obtaining within and without the carbon chamber.

2. A carbon microphone having means forming a carbon chamber, said means comprising a wall delimiting a part of said carbon chamber, part of said wall consisting of a disk made of silk which is air permeable, a flexible moisture impermeable foil for sealing said carbon chamber to the exterior, said sealing foil being fastened at the same places as the silk disk and at least one rim of said sealing foil being bonded to said silk disk, with said foil extending across and overlying the air permeable part of said wall and operative, responsive to external air pressure fluctuations, to flex with respect to said air permeable part, said foil and the air permeable part of said wall having an intermediate spacing at average atmospheric air pressure which, responsive to an increase of the external air pressure, is just sufficient to effect, by flexing of the moisture impermeable foil relative to the air permeable part, a pressure equalization between the air pressure obtaining within and without the carbon chamber.

3. A carbon microphone having means forming a carbon chamber, said means comprising a wall delimiting a part of said carbon chamber, part of said wall being air permeable, a flexible moisture impermeable foil for sealing said carbon chamber to the exterior, means for fastening the moisture permeable foil on said air permeable part directly adjacent to the fastening point of the latter, said foil extending across and overlying the air permeable part of said wall and operative, responsive to outside air pressure fluctuations, to flex with respect to said air permeable part, said foil and the air permeable part of said wall defining a volume at average atmospheric air pressure which, responsive to an increase of the external pressure, is just sufficient to effect, by flexing of the moisture permeable foil relative to the air permeable part, a pressure equalization between the air pressure obtaining within and without the carbon chamber.

4. A carbon microphone according to claim 3, wherein said moisture impermeable foil consists of elastic material with relatively great extension coefficient.

5. A carbon microphone according to claim 3, wherein said moisture impermeable foil consists of a thermoplastic material and extends at average atmospheric air pressure in folded manner between the fastening points thereof.

6. A carbon microphone according to claim 3, wherein said air permeable part of said wall consists of a disk made of silk.

References Cited by the Examiner

UNITED STATES PATENTS

| | | | |
|---|---|---|---|
| 2,410,528 | 11/1946 | Soldan | 179—123 |
| 2,532,694 | 12/1950 | Bryant | 179—122 |

KATHLEEN H. CLAFFY, *Primary Examiner.*

WILLIAM C. COOPER, ROBERT H. ROSE, *Examiners.*

R. M. GOLDMAN, F. N. CARTEN, *Assistant Examiners.*